Figure 1:
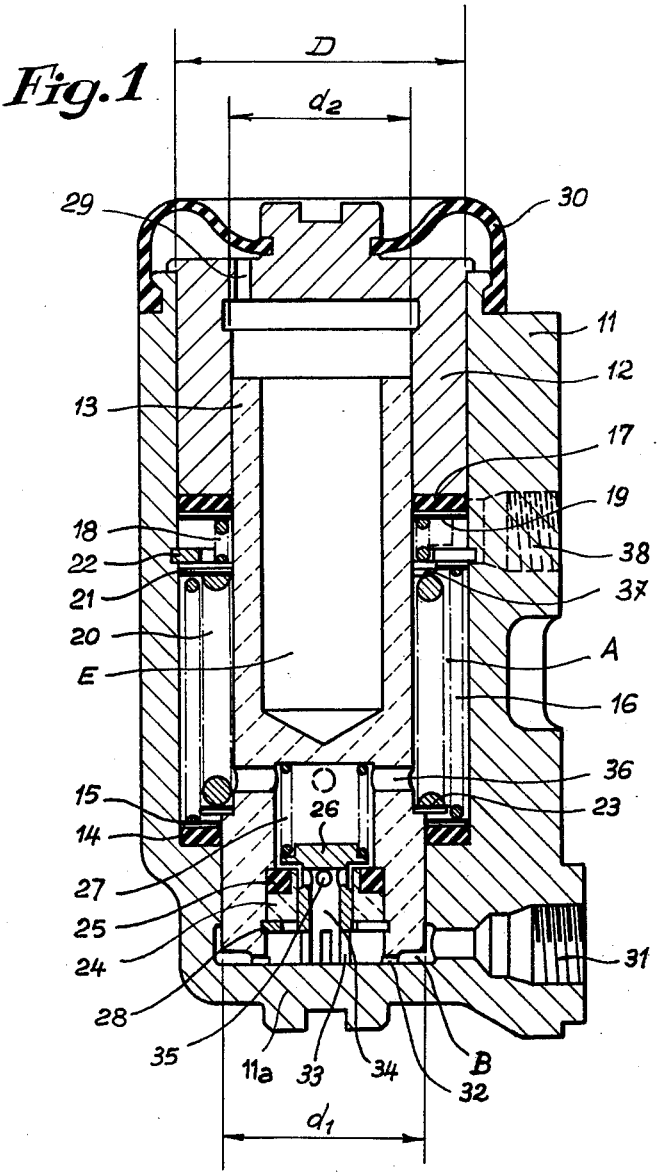

United States Patent Office 3,035,415
Patented May 22, 1962

3,035,415
HYDRAULIC BRAKE BOOSTER
Dante Giacosa, Turin, and Philip S. Baldwin, Florence, Italy, assignors, by direct and mesne assignments, of one-half to Fiat Societa per Azioni, Turin, Italy, and one-half to said Philip S. Baldwin
Filed Aug. 16, 1960, Ser. No. 49,913
Claims priority, application Italy Sept. 5, 1959
8 Claims. (Cl. 60—54.6)

This invention relates to a hydraulic operating pressure booster cylinder, more particularly for actuating friction braking members of hydraulic brake mechanisms for vehicles, comprising a casing defining a longitudinal cylindrical chamber closed at one end by an end wall of the casing and at its other end by a main piston movable in the chamber, the latter being connected in proximity to the abovementioned end wall with a source of liquid adapted to supply pressure liquid to the said chamber.

A purpose of this invention is to reduce the effort required on the brake pedal in conventional brake mechanisms, the hydraulic pressure in the wheel cylinders, pedal stroke and admissible lining wear before re-adjustment of the clearance being the same.

A further purpose of this invention is to lower the operating pressure throughout the part of the hydraulic circuit external of the wheels, thereby reducing the stresses on the circuit, resilient expansion of the hoses, consequently the pedal stroke percentage required to make up for said expansion.

A further purpose of this invention is to make available at the operating cylinders for the wheel brakes a hydraulic working pressure which is considerably higher than the maximum pressure admitted by the hoses.

A further purpose of this invention is to permit use of the disc or drum brakes of the type in which both brake blocks are swung for braking in the same direction, corresponding to the direction of rotation of the drum, in conventional hydraulic brake mechanisms without adopting, as is usually necessary in such cases, elaborate expensive devices, such as servo-brakes, in order to keep the effort on the pedal within current average limits.

A further application of even date by applicants discloses the optimum range of the theoretical increment ratio at which hydraulic pressure boosters provided at the wheel brakes should operate, in order to fulfill the abovementioned purposes, the said range being 2.5 to 6.

Operating pressure boosters devices are known, which are arranged on each wheel fitted with brakes; however, such devices afford a theoretical increment ratio which is well below the lower limit of the abovementioned range; besides, the principle on which they operated will not admit increment ratios such as are required to fulfill the purposes set out above.

The improved device comprises a piston movable in the portion of the hollow adjacent the end wall, the piston face near the end wall being constantly acted upon by the hydraulic pressure from the above mentioned source, the said piston subdividing the chamber into at least two chambers situated between the auxiliary piston and said end wall and between the auxiliary piston and main piston, respectively, a portion of the auxiliary piston being guided on its side facing the master piston on a cylindrical guide, surface smaller in diameter than the above mentioned portion of the chamber in which the auxiliary piston moves, so that the area of the latter which is acted upon by the hydraulic pressure prevailing in the second mentioned chamber is materially smaller than its face acted upon by the hydraulic pressure in the first chamber, the device moreover providing a passageway interconnecting the first and second chambers, a valve adapted to control the liquid flow between the two chambers through the passageway and at least one reaction spring interposed between, the auxiliary piston and a member carried by the cylinder body, adapted to resist the forward movement of the auxiliary piston in the direction of the main piston, the said valve interconnecting the first and second chambers when the auxiliary piston is at the end of its stroke near the end wall, intercepting said communication only after a displacement of the auxiliary piston against the opposing reaction spring and preventing return of the liquid from the second to the first chamber when the pressure in the second chamber exceeds the pressure in the first chamber, the said reaction spring being mounted in the cylinder under an initial load to cause the displacement of the auxiliary piston and intercepting of the connection between the two chambers to occur only after the hydraulic pressure transmitted to the cylinder from the source has reached a predetermined value.

Figure 4:
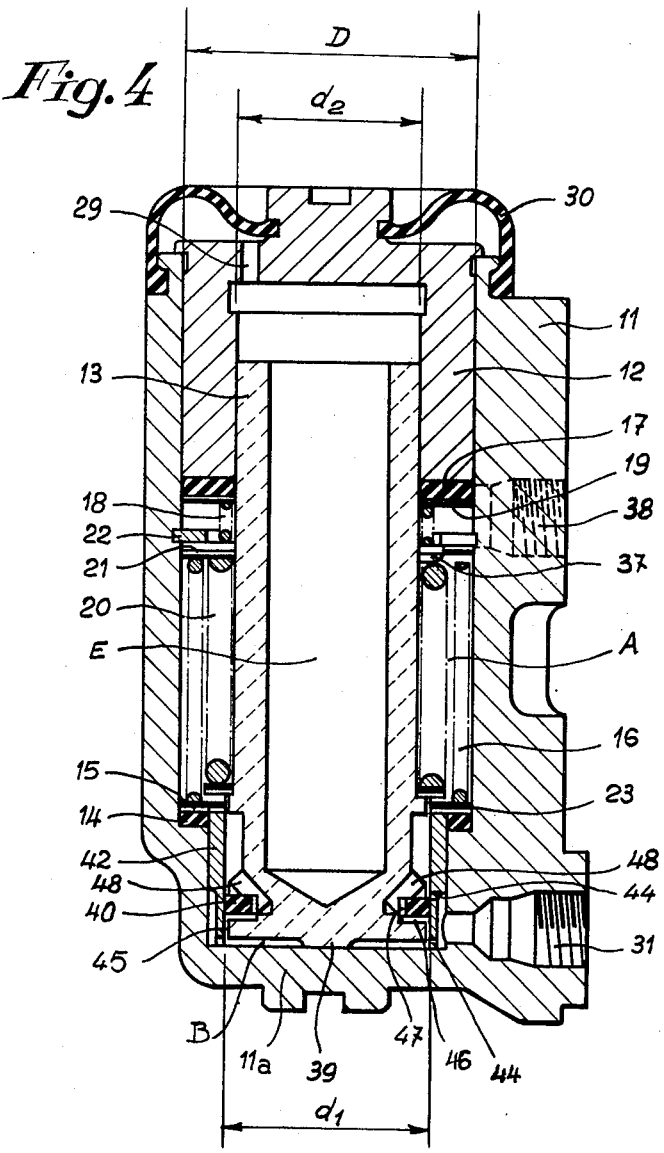
Figure 5:
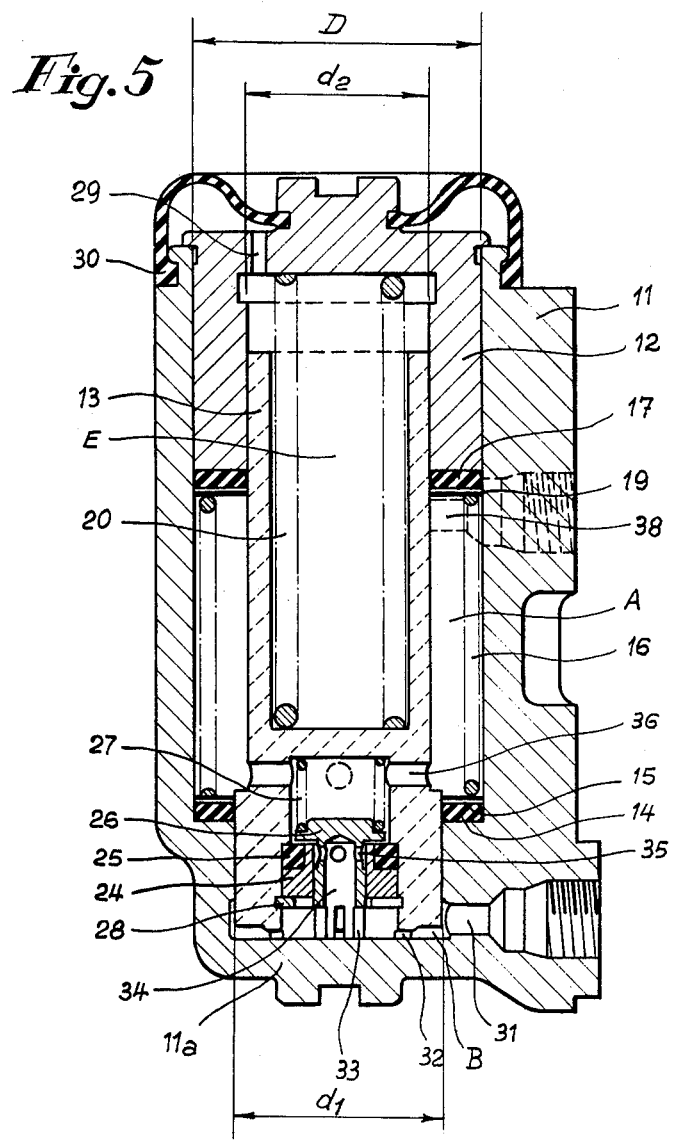
Figure 6:
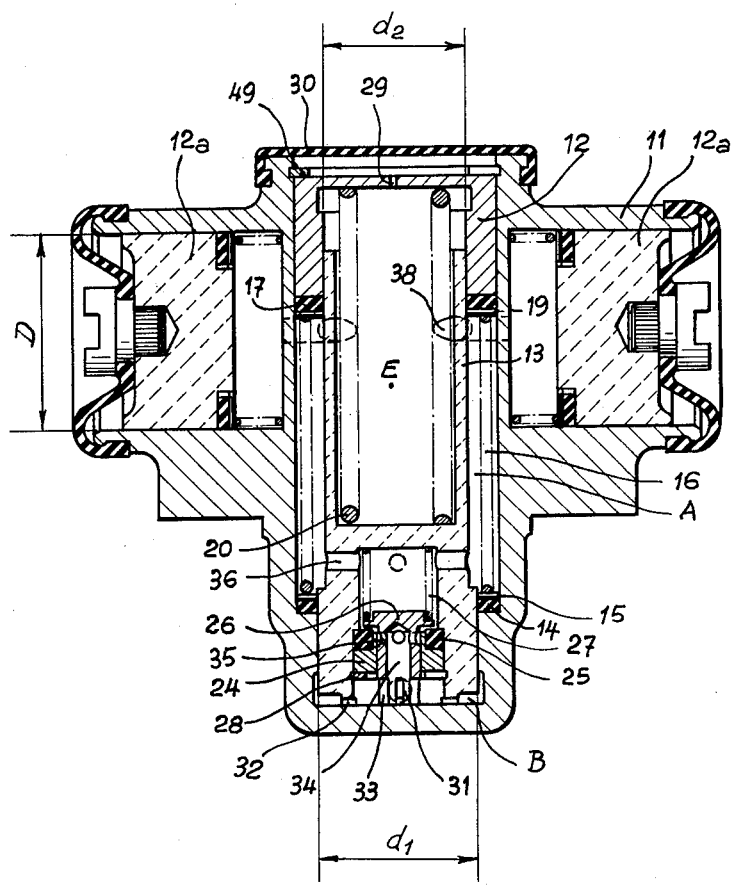
Figure 8:
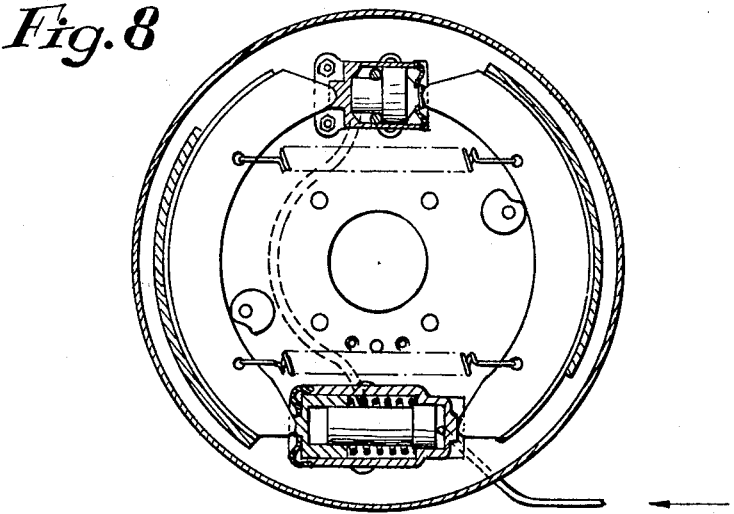
Figure 7:
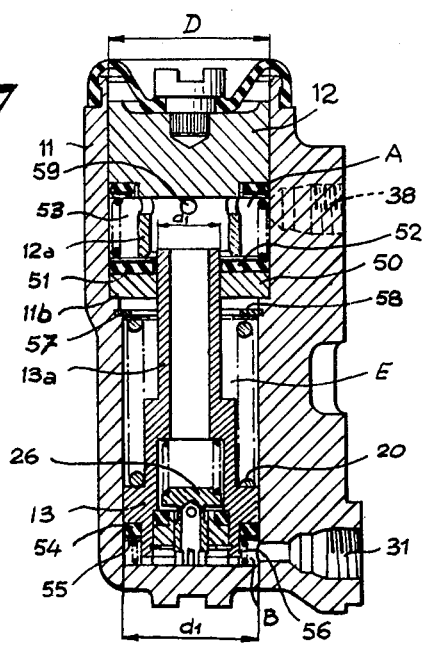
Figure 9:
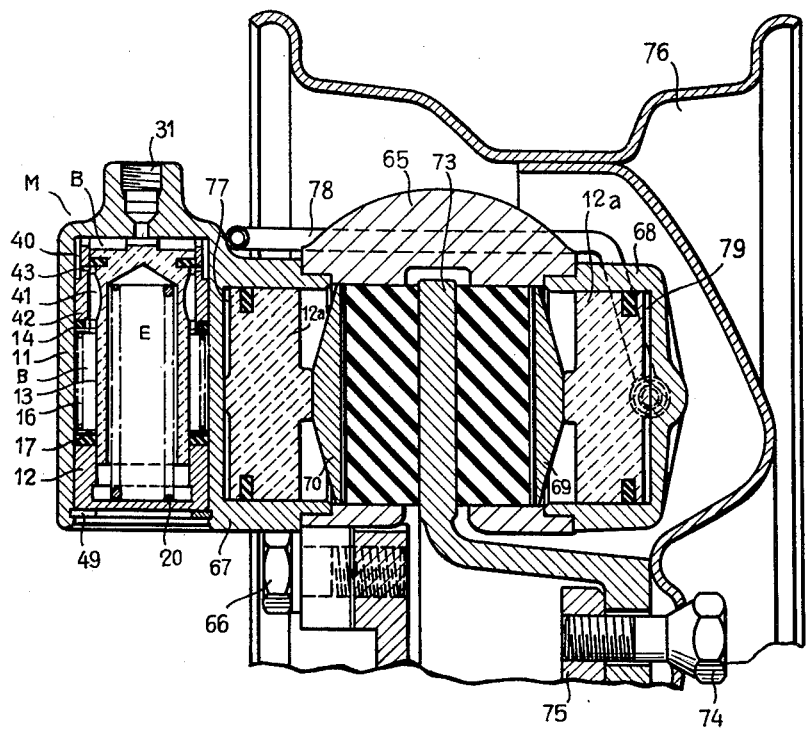

Further characteristic feature and advantages will be understood from the appended description referring by way of non-limiting examples to embodiments thereof shown on the accompanying drawings, wherein:

FIGURES 1 to 5 are longitudinal sectional views of cylinder constructions according to this invention, the master piston serving not only as a guide for the auxiliary piston but acting additionally on the friction members of the wheel brakes, FIGURE 6 is a longitudinal sectional view of a modification of the cylinder, in which the master piston serves as a guide for the auxiliary piston but leaves the friction members unaffected, FIGURE 7 is a longitudinal sectional view of a modified cylinder, the master piston of which acts on the friction members of the wheel brakes, but does not act as a guide for the auxiliary piston;

FIGURE 8 is a part sectional diagrammatical view of a wheel brake equipped with the improved cylinder, FIGURE 9 is a sectional view of a disc brake incorporating the improved cylinder.

Similar main components are denoted throughout the figures by the same reference numerals.

The pressure booster cylinder shown in section in FIGURE 1 is suitable for direct operation of one out of the two brake blocks on a brake of the type in which both brake blocks are swung for braking in the same direction corresponding to the sense of rotation of the brake drum. The other brake block is operated by a conventional cylinder connected to the high pressure chamber of the pressure booster cylinder by a short stiff tube section, as shown in FIGURE 8. Of course, the cylinder construction according to FIGURE 1 is not limited in use to this special type of a vehicle wheel brake.

In FIGURE 1, 11 denotes a cylinder body, 12 a master piston which directly acts on the brake block and is of a diameter D, 13 an auxiliary booster piston, the diameters of which are denoted by $d_1$ and $d_2$. The chamber in the cylinder is closed on the remote side of a piston 12 by an end wall 11a which in the examples shown is integral with a cylinder body 11, but could alternatively comprise, for instance, a plug screwed into a tapped portion of the inner hollow in the body 11 or a cup-shaped member screwed from the outside to the casing. The body 11 can be made up of a number of suitably interconnected sections.

The characteristic areas of this structure are:

$$A_1 = \frac{\pi d_2^1}{4} \text{ low pressure area}$$

$$A_2 = \frac{\pi}{4} d_2^1 - d_2^2 \text{ high pressure area}$$

$$A_d = \frac{\pi}{4} d_2^2 \text{ differential area}$$

$$A_e = \frac{\pi}{4} (D^2 - d_2^2) \text{ effective area of the master piston}$$

The theoretical pressure ratio is:

$$\rho = \frac{A_1}{A_2} = \frac{d_1^2}{d_1^2 - d_2^2}$$

B denotes a first or low pressure chamber, A a second or high pressure chamber, E a chamber preferably at atmospheric pressure. The chambers A and B are mutually sealed by a packing 14 held in place through a washer 15 by a spring 16. The chamber A is sealed to the outside by means of a packing 17 pressed against the master piston 12 by a spring 18 through a washer 19. A coil spring 20 bears at one end on a corrugated disc 21 abutted by an expansible ring 22, and at its other end on a washer 23 centered on the smaller diameter $d_2$ of an auxiliary piston 13.

The spring 20, which is mounted under a certain initial load corresponding to the intervention pressure $p_i$, normally holds the auxiliary piston 13 pressed against the bottom of the low pressure chamber B. The auxiliary piston 13 encloses at its larger diameter $d_1$ a valve comprising a valve-holder 24, packing 25, valve body 26 and spring 27. The parts are held in place by an expansible ring 28. Under inoperative conditions the valve is open and lets oil through from chamber B to chamber A. The auxiliary piston 13 is capable of performing a limited stroke over which it is guided on the larger diameter $d_1$ by a cylindrical seating in the chamber B, and on the smaller diameter $d_2$ by the cylindrical seating within the master piston 12. The chamber E formed by the lightening recess in the auxiliary piston 13 and recess in the master piston 12 connects with the outside through a vent 29. A membrane 30 secured to the casing 11 and master piston 12 prevents access of water and dust to the cylinder.

Alternatively, the chamber E could be closed and filled with a compressible fluid.

During the approach stroke oil flows to the cylinder through an inlet hole 31, notches 32 in the head portion of the auxiliary piston 13, notches 33, axial bore 34, radial holes 35 in the valve body 26, radial holes 36 in the auxiliary piston, notches 37 in the corrugated disc 21 and outlet hole 38, whence it reaches the conventional cylinder operating the other brake block.

The oil pressure $p$ acts on the effective area $$A_e = \frac{\pi}{4}(D_2 - d_2^2)$$

to move the master piston 12 and cause its respective brake block to approach the drum.

As the pressure within the cylinder reaches the value $p_i$ (intervention pressure), the auxiliary piston 13 starts moving and, once the valve has closed, it performs its setting stroke, thereby gradually raising the pressure in the chamber A with respect to the pressure in chamber B.

On release of the brake pedal the auxiliary piston moves back under the action of pressure in the chamber A and of the reaction spring 20, the valve opens again and oil can flow back from chamber A to chamber B, hence to the pump, allowing of return of the master piston 12 and piston of the conventional cylinder, hence release of the brake blocks from the drum.

Figure 2:
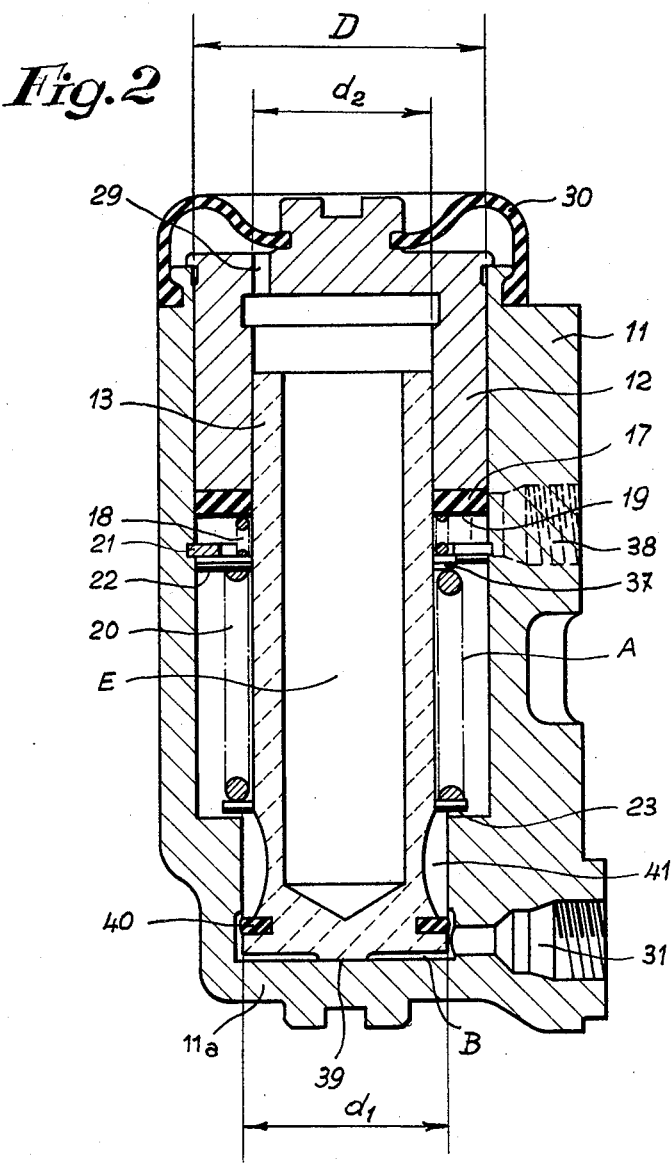

A modification of the above described cylinder is shown in FIGURE 2. It will be seen from this figure that the auxiliary piston 13 pressed by the reaction spring 20 normally bears by its projection 39 on the bottom of the chamber B. A packing 40 on the head portion of the auxiliary piston 13 is situated in this case outside the cylindrical seat of a diameter $d_1$, allowing oil flow during the approach stroke to the chamber A through the inlet hole 31, chamber B and longitudinal notches 41 in the auxiliary piston 13.

As pressure reaches its value $p_i$ the auxiliary piston 13 starts moving, when the packing 40 by suiting with a slight interference the cylindrical seat of a diameter $d_1$ intercepts the connection between the chambers A and B. The boosting step starts at this stage similarly as in the previous construction.

Figure 3:
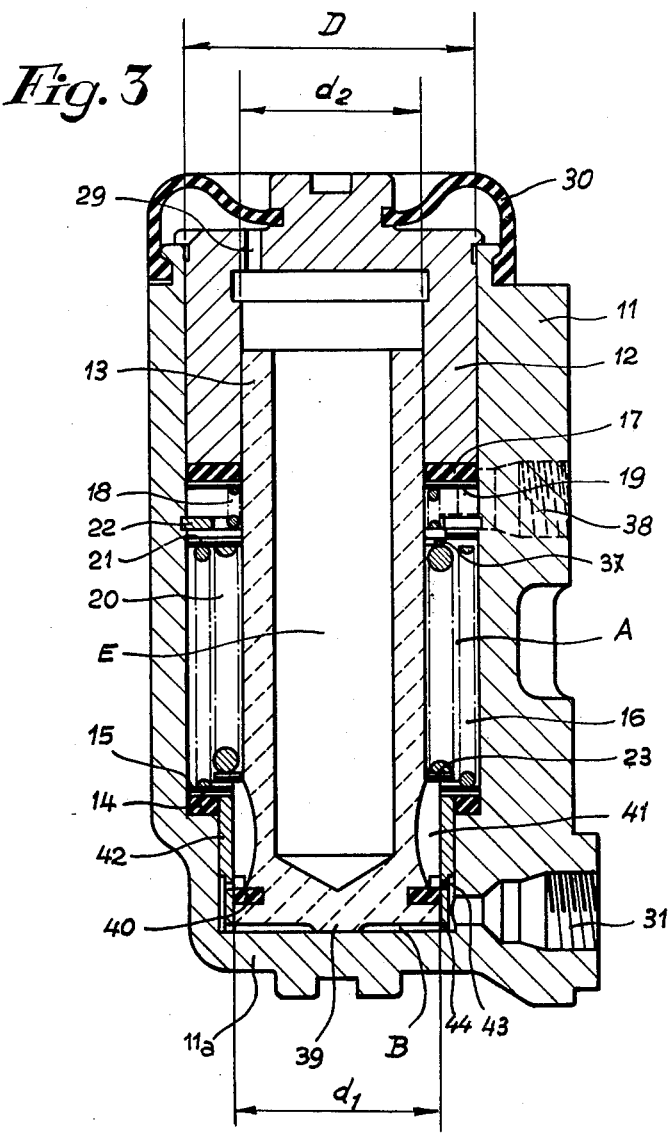

In the construction shown in FIGURE 3 the auxiliary piston 13 is guided on the larger diameter $d_1$ by the inner cylindrical seating in a bushing 42. The bushing 42, which bears on the bottom of the casing 11, is held in place together with its packing 14 by spring 16 through washer 15. When the auxiliary piston 13 is inoperative, the packing 40 is slightly displaced towards an end wall 11a with respect to narrow cross notches 43 in bushing 42. During the approach step oil can therefore freely flow from chamber B to chamber A through the above-mentioned notches 43 and notches 41 in the auxiliary piston 13. The two chambers are disconnected when, as a consequence of the displacement of the auxiliary piston 13, the packing 40 moving over the cylindrical seating of a diameter $d_1$ reaches past the notches 43.

In the construction shown in FIGURE 4 the packing 40 for the auxiliary piston 13 is mounted in its seating with an appreciable both axial and radial play.

During the approach step oil flows through inlet hole 31, notches 44 in the bushing 42, clearance 45 between the auxiliary piston 13 and bushing 42, clearance 46 and 47 between the packing 40 and seating therefor, and holes 42 in the auxiliary piston 13, then reaching the chamber A. At this early stage the oil pressure acts in an axial and radial direction the packing 40 in a favorable direction for maintaining passages 46, 47. As the auxiliary piston starts moving as the pressure $p_i$ is reached, since the oil tends to flow back from chamber A to chamber B, the direction of the axial thrust on the packing 40 is reversed and closes the passage 46 disconnecting both chambers.

On release of the brake pedal upon completion of the boosting stroke, the auxiliary piston 13 is restored to its initial position; however, since the packing 40 is still subjected to pressure $p_i$, the passage 46 remaining consequently closed, the oil which has flown from chamber B to chamber A during the approach stroke could not flow back to the pump and the brake blocks would be further slightly pressed against the drum. As a remedy therefor a bleed hole 44a is formed in the bushing 42, through which interconnection of the chambers A, B is re-established, when the auxiliary piston 13 resumes its inoperative position.

FIGURE 5 shows a modification of the cylinder shown in FIGURE 1, which can be adopted also with constructions as shown in FIGURES 2, 3 and 4. The main differences resides in the fact that the reaction spring 20 is arranged in the chamber E, the said spring bearing at its ends on the auxiliary piston 13 and master piston 12, respectively.

The spring 16 holds in place through the washers 15 and 19 the packings 14 and 17. However, this cylinder construction is preferably adopted when the clearance between the brake blocks and drum is adjusted without altering the position of the master piston 12 having the reaction spring 20 and brake blocks, respectively, bearing thereon. When the clearance is adjusted by means of eccentrics, adjustment of the clearance to allow for play would gradually withdraw the master piston 12, thereby considerably reducing the initial load on the reaction spring 20, hence the intervention pressure $p_i$.

FIGURE 6 relates to a cylinder construction suitable for direct operation of both brake blocks on one brake, when the brake blocks are oscillated in opposite directions on braking.

The auxiliary piston 13 is arranged with its axis at an angle of 90° to the axis of the piston 12a operating the brake blocks and is guided over the larger diameter $d_1$ by the cylindrical seating in the chamber B and smaller diameter $d_2$ by the inner cylindrical seating in the main piston 12. The reaction spring 20 is arranged in the chamber E and bears at its ends on the auxiliary piston 13 and master piston 12, respectively, which is abutted by the expansible ring 49.

In addition to admitting the modifications according to FIGURES 2, 3 and 4 this cylinder construction can be carried out with one piston 12a only to directly operate one brake block only, when it affords over previously described constructions the advantages of a reduced axial overall size.

FIGURE 7 shows a modification of the cylinder, the auxiliary piston 13 of which is guided over the diameter $d_2$ in the central bore in a disc 50 inserted into the cylinder body 11 and bearing on a radial shoulder 11b on the said casing.

The casing 51 seals the chamber E and A against each other. The disc 50, packing 51 and washer 52 are held in position by spring 53. The chambers E, B are mutually sealed by packing 54 held in place through washer 55 by spring 56. The oil flows between the chambers A, B over a through bore in the piston 13 past the valve 26.

The reaction spring 20 is located in the chamber E between the inner wall of the cylinder body 11 and periphery of an axial projection 13a on the auxiliary piston 13 and bears at its end facing the master piston on an abutment formed by a washer 57 held in place by an expansible ring 58.

An annular projection 12a on the main piston 12 has radial holes 59 bored therein for interconnecting the inside of the said projection and surrounding annular space when the master piston 12 bears on the surrounding washer 52. The chamber A can be connected by one or a plurality of holes 38 with one or a plurality of operating cylinders.

With the just described construction the master piston can still be held against withdrawal from the cylinder casing by an abutment, such as an expansible ring. The annular space around its axial projection can connect in this case through holes bored in the wall of the body 11 with two operating cylinders directly bored in the cylinder body 11, whereby a structure very similar to the construction shown in FIGURE 6 is obtained.

It will be seen that, as distinct from the previously described constructions, the second or high pressure chamber A instead of being constituted by the annular space between the inner wall of the cylinder casing 11 and periphery of the axial projection on the auxiliary piston, comprises the portion of the through bore in the auxiliary piston past the valve 26 and the space between the main piston and packing bearing on disc 50.

The chamber E between the inner cylinder wall and periphery of the axial projection on the auxiliary piston, can be connected with the outside through a hole, but is preferably sealed and air-filled.

Though in this description the adoption of the pressure booster cylinder for operation of the brake blocks has been referred to the simpler case of drum brakes, it will be clear that devices substantially identical with those illustrated above can be used also for operating the brake applying members of disc brakes.

An embodiment is shown in FIGURE 9, in which the pressure booster feeds one out of the two operating cylinders and friction pads of the disc brake. Referring to the figure this brake type comprises a casing 65 attached by means of bolts 66 to a component which is not rotated. The casing has attached thereto the two operating cylinders 67, 68 within which the two pistons 12a move, which press by the action of the hydraulic pressure through plates 69 and 70 the friction pads 71, 72 against the two front faces of the disc 73 connected by means of bolts 74 to the hub 75 on the wheel 76.

The structure of the pressure booster generally denoted by M corresponds in part in the example shown to the diagrams shown in FIGURES 3 and 6, respectively. The device is made of one piece with the operating cylinder 67, its high-pressure chamber A connecting through a hole (not shown) with a chamber 77 in the cylinder 67. The chamber 77 is connected in turn by a short rigid pipe 78 to the chamber 79 in the second cylinder 68.

It will be obvious that, the principle of the invention being left unaltered, embodiments and constructional details can be further varied with respect to the example described above and shown without departing from the scope of this invention.

What we claim is:

1. A fluid pressure actuated motor comprising a cylinder having a longitudinal inner bore open at one end and closed at its other end by a bottom wall of the cylinder, a first piston movable in said bore and arranged near the open end of the latter and closing said bore, a second piston movable in said bore and arranged near said bottom wall and forming with said first piston a second chamber within said cylinder, a passageway in said cylinder for constantly connecting said first chamber with a variable pressure fluid source, cooperating cylindrical guide surfaces on said first and second pistons which are smaller in diameter than said second piston, whereby the face of the latter subjected to the fluid pressure in said second chamber is smaller than its face subjected to the fluid pressure in said first chamber, a passageway between said first and second chamber, a valve for controlling the fluid flow through said last mentioned passageway, a reaction spring arranged in said second chamber and having its one end bearing on said first piston and a member carried by the cylinder forming the bearing for the other end of said spring, said spring being mounted under initial load such that the movement of said second piston begins only after the fluid pressure in said first chamber has reached a predetermined value, said valve being open when said second piston is in its position at which the load acting on the spring does not exceed said initial load and closing and constantly intercepting the communication between said first and second chambers when said second piston is displaced against the action of said reaction spring.

2. A motor as set forth in claim 1, wherein a spring is interposed between said first and second pistons, means being provided for preventing the first piston from sliding out of the cylinder.

3. A motor as set forth in claim 2, comprising two further pistons slidably mounted in lateral bores provided in the cylinder and communicating with said second chamber in the cylinder.

4. A motor as set forth in claim 1, wherein a cylindrical projection is provided at the face of said second piston facing said first piston, said projection being slidably mounted in an opening bored in said first piston.

5. A motor as set forth in claim 4, wherein means are provided for tightly sealing the zone at which said projection of the second piston penetrates in the opening bored in said first piston, said means comprising an annular packing arranged in said second chamber surrounding said projection and bearing on said first piston, a washer bearing on said annular packing and a spring one end of which bears on said washer, bearing means fast with the cylinder being provided inside the second chamber for abutting the other end of said spring bearing on said washer.

6. A motor as set forth in claim 1, wherein for guiding said second piston in the cylinder a bushing is inserted in the cylinder bore, said bushing abutting said bottom wall of the cylinder and having at its end abutting said bottom wall a portion of an outer diameter smaller than the diameter of the portion of the cylinder bore adjacent said bottom wall and radial notches cut at said end abutting the latter, and radial bores at the end of its portion of smaller outer diameter opposite said notches, the inner diameter of said bushing being slightly greater than the diameter of said second piston, the latter having cut at its outer periphery an annular groove, an annular packing of resilient material being arranged in said groove, said packing adhering elastically to the inner periphery of said bushing and having its inner diameter greater than the diameter of the bottom of said groove, the axial width of said packing being smaller than that of said groove, means being provided for spacing said second piston from said bottom wall of the cylinder and for constantly connecting the bottom part of the groove with said second chamber in the cylinder, the position of said groove on said second piston being such that said resilient packing is arranged always nearer said bottom wall than said radial bores provided at the end of the portion of smaller outer diameter of said bushing, whereby communication between said first and second chamber is always ensured till said second piston moves towards said piston when the fluid pressure transmitted to said cylinder becomes greater than a predetermined value.

7. A motor as set forth in claim 1, wherein the ratio between the area of said second piston exposed to the fluid pressure acting in said first chamber and the area of said second piston exposed to the fluid pressure acting in said second chamber is not smaller than 2 and does not exceed 6.

8. A motor as set forth in claim 1, comprising means for preventing said first piston from slipping out of the cylinder, the diameter of said first piston being greater than that of said first piston and said pistons having each an axial projection at their ends facing each other, a centrally bored disc being arranged in said second chamber and dividing it in two parts, the projection of said first piston bearing on said disc and maintaining it spaced from the first piston while the projection of said second piston extending through the bore of said disc and being slidably mounted in said bore, said passageway between said first and second chamber having the form of an axial through channel bored in said second piston and in the projection of the latter, whereby upon the protractile stroke of said second piston and the closure of the valve controlling the fluid flow through said passageway a pressure substantially greater than that acting in said first chamber will be established in the portion of said second chamber enclosed between said disc and said first piston, sealing means being also provided for constantly preventing the fluid flow between said two portions of said second chamber and for preventing any displacement of said disc towards said bottom wall of the cylinder.

References Cited in the file of this patent

UNITED STATES PATENTS

| | | |
|---|---|---|
| 1,704,762 | Reynolds | Mar. 12, 1929 |
| 2,227,245 | Carroll | Dec. 31, 1940 |
| 2,282,556 | Bowen | May 12, 1942 |
| 2,374,011 | Gunderson | Apr. 17, 1945 |
| 2,442,057 | Page | May 25, 1948 |
| 2,924,073 | Schnell | Feb. 9, 1960 |
| 2,928,246 | Sjodin | Mar. 15, 1960 |